United States Patent [19]

Stricker et al.

[11] Patent Number: 5,590,789
[45] Date of Patent: Jan. 7, 1997

[54] PROCESS AND DEVICES FOR SORTING THERMOPLASTIC COMPONENTS FROM A MIXED STREAM

[76] Inventors: Urban Stricker, Am Steimel 18, D-57271 Hilchenbach; Martin Siebert, Holsteinische Strasse 15, D-12163 Berlin, both of Germany

[21] Appl. No.: 302,719

[22] PCT Filed: Mar. 6, 1993

[86] PCT No.: PCT/EP93/00509

§ 371 Date: Sep. 8, 1994

§ 102(e) Date: Sep. 8, 1994

[87] PCT Pub. No.: WO93/17852

PCT Pub. Date: Sep. 16, 1993

[30] Foreign Application Priority Data

Mar. 9, 1992 [DE] Germany ............... 42 07 398.7

[51] Int. Cl.⁶ .................................................. B07B 13/00
[52] U.S. Cl. ................. 209/11; 209/46; 209/700; 106/2
[58] Field of Search ................ 209/3, 3.1, 11, 209/45, 46, 599, 615, 616, 700; 106/2

[56] References Cited

U.S. PATENT DOCUMENTS

| | | | |
|---|---|---|---|
| 3,002,840 | 10/1961 | Kern et al. ................................. | 106/2 |
| 3,020,583 | 2/1962 | Lapeyre et al. ........................ | 209/46 X |
| 3,114,703 | 12/1963 | Brison ........................................ | 209/11 |
| 3,599,788 | 8/1971 | Fyfe et al. ............................. | 209/46 X |
| 3,793,424 | 2/1974 | Haga .................................... | 209/700 X |
| 4,892,647 | 1/1990 | Liddle et al. .............................. | 209/11 |

FOREIGN PATENT DOCUMENTS

| | | |
|---|---|---|
| 3722777C2 | 1/1989 | Germany . |
| 4207398C1 | 9/1993 | Germany . |
| 53-129268 | 11/1978 | Japan . |
| 54-2247 | 2/1979 | Japan . |
| 56-70915 | 6/1981 | Japan . |
| 1567290 | 5/1990 | U.S.S.R. .................................. 209/45 |
| 2240731 | 8/1991 | United Kingdom . |
| WO88/00098 | 1/1988 | WIPO . |

OTHER PUBLICATIONS

"Soviet Inventions Illustrated" Section Ch: Chemical (1988) Derwent Publications.

*Primary Examiner*—James R. Bidwell
*Assistant Examiner*—Tuan Nguyen
*Attorney, Agent, or Firm*—Herbert Dubno

[57] ABSTRACT

Thermoplastic articles are removed from a mixed waste stream and are sorted by heating the articles along the path of the waste stream to different softening temperatures of the different types of articles before the articles contact the separating bodies which have surface formations that are forced into the softened zones of the thermoplastic article so that the articles are impaled upon the body. The articles are then removed. The force with which the softened articles are impaled is obtained by a support or counterforce member juxtaposed with the separating bodies.

10 Claims, 4 Drawing Sheets

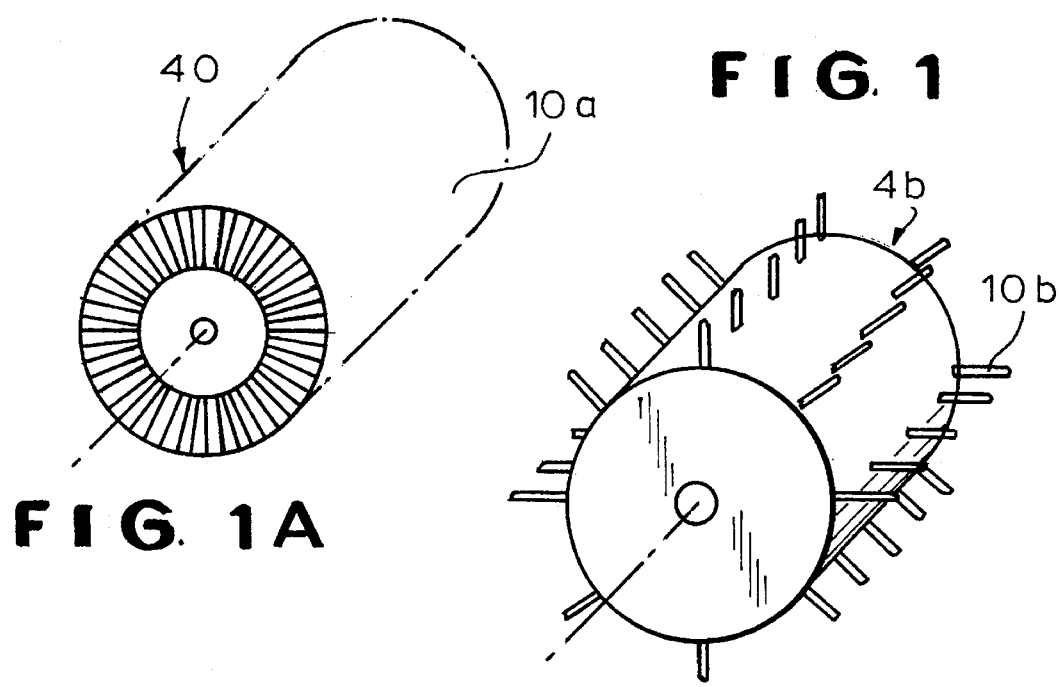
FIG. 1
FIG. 1A
FIG. 1B
FIG. 1C
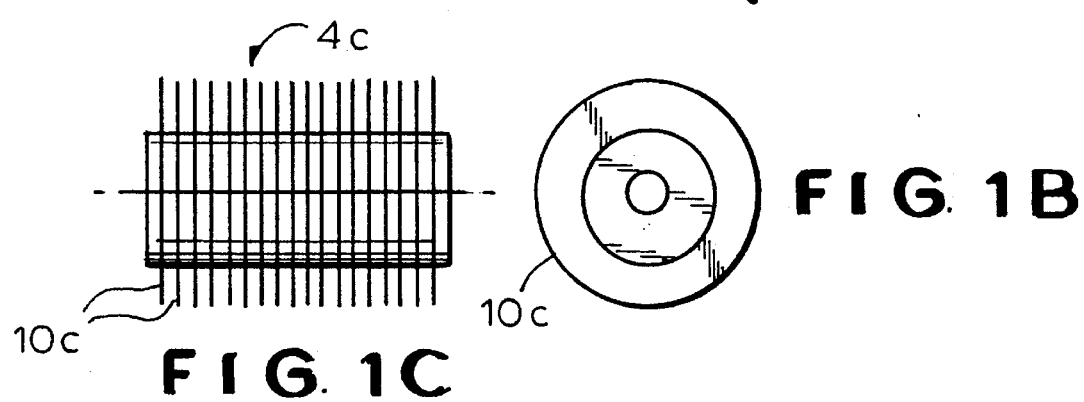
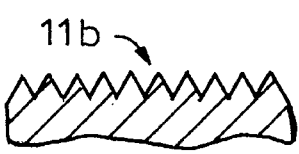
FIG. 2A
FIG. 2B
FIG. 2C
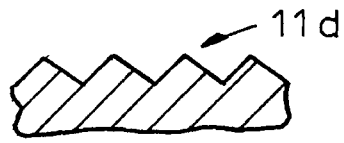
FIG. 2D

FIG. 3
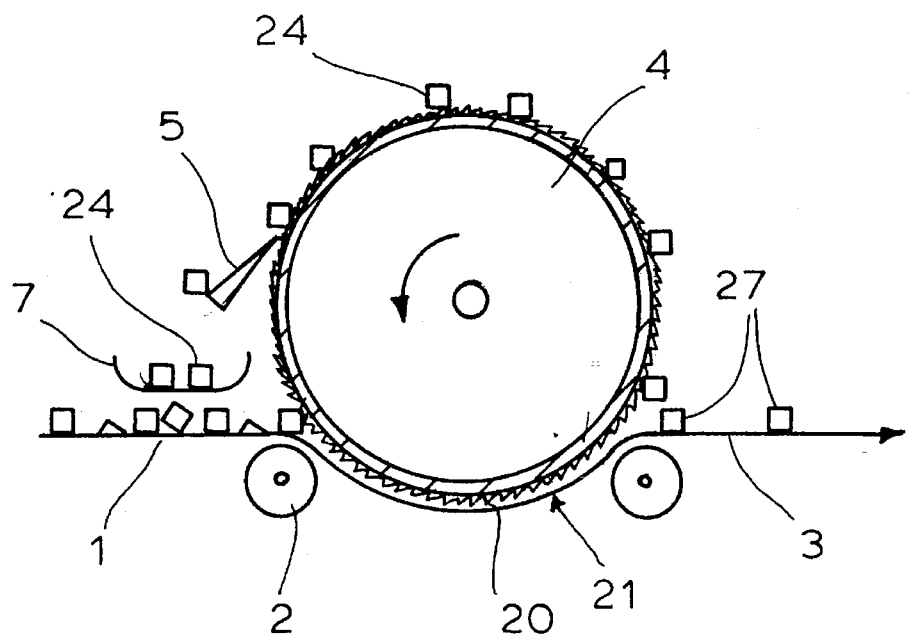
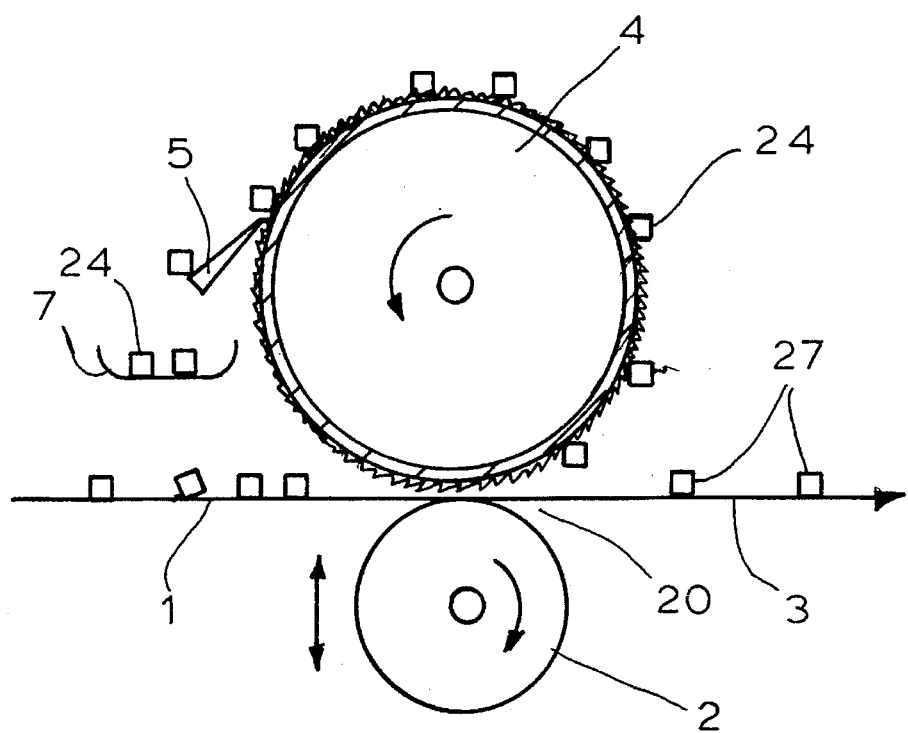
FIG. 4

PROCESS AND DEVICES FOR SORTING THERMOPLASTIC COMPONENTS FROM A MIXED STREAM

CROSS REFERENCE TO RELATED APPLICATIONS

This application is a national phase of PCT/EP93/00509 filed 6 Mar. 1993 and based upon German national application P 42 07 398.7 filed 9 Mar. 1992 under the International Convention.

Our present invention relates to a process for separating thermoplastic components from a mixed stream when sorting different types of thermoplastic materials in contact with separating bodies; the invention also relates to devices for implementing the process.

BACKGROUND OF THE INVENTION

Different types of thermoplastic materials soften at different temperatures or within different temperature ranges. The changes in the physical properties of the thermoplastic materials which take place during softening can be used for the sorting of plastic materials or for the separation of plastic materials from materials such as glass or metal. This problem arises particularly during recycling. For this purpose plastic materials have to be selectively softened corresponding to their type and removed from the mixed stream by appropriate devices.

According to the state of the art thermoplastic components are sorted out from a mixed stream by bringing the mixed stream into contact with a sufficiently heated separation surface, whereby the plastic components adhere to the separation surface due to the melting of their contact zones onto this surface. This removes the thermoplastic articles from the mixed stream and enables them to be subsequently scraped off (DE-37 27 777 C2).

Since this separation principle relies on the adherent behavior of plastic materials to be sorted which are softened to the point where they are almost melted and fluid, it is sensitive to contamination in practice, such as during the recycling of plastic materials. Inherent wetness, residuals of the formerly contained goods or labels can hinder the adhesion. The quantitatively interesting polyolefin plastics are by nature bad adhesives and therefore not very readily separated by this sorting method.

Furthermore in this process during operation the sorting surface is increasingly covered by a layer of softened thermoplastics. This layer renders the process less effective, on the one hand due to reduced heat transmission, and on the other hand due to the fact that as a result of the adhesive action of softened thermoplastic material, plastic components which in themselves are not softened at the respective temperature and therefore are not among the target fraction, can stick to this layer. As a result the purity of the target fraction is questionable.

In the separation process according to WO-A-88/000 98 the thermoplastic components are not softened through selective heating and especially not in temperature zones which are specific to type. The components become adhesive due to the temperature of the metal surfaces they come in contact with and melt on the latter. The device required for carrying out the process is extremely complicated and expensive. It is particularly hard to conceive how the pins or lances rotating together with an eccentrically supported pin roller can be heated to be brought precisely to a certain temperature by the heating device inside a drum, so that previously unheated plastic components can melt on it when passing by.

A further drawback of this device working according to the unsatisfactory principle of separation based on adhesion is that it is necessary to provide here special cleaning devices for the removal of the molten residuals of the plastic components from the heated surfaces. For this purpose a separate burner device for singeing the outer roller surface is used, with subsequent brushing or another kind of removal of the remaining residuals.

U.S. Pat. No. 3,793,424 is based on the principle of separation through adhesion or adhesive behavior of the plastic components. There it is indicated that the dry particles are fed to a heated, moving substrate, to which the plastic materials with a lower softening point adhere and the particles with a higher softening point flow freely over it.

JP-A-54 022 477 can also classified as based on the unsatisfactory principle of separation through adhesion. There, in the center of a collection chamber, is an electrically heated cylinder with a conical end. Through that a plastic component is melted in a punctiform manner and penetrates with the melt into the area of the collection chamber. The process comprises the following steps:

(a) local heating of a limited portion in the thermoplastic material with the conical end of a heating element with high thermal conductivity, (b) this material is brought into contact with a second element of lesser thermal conductivity with a collection chamber, (c) continuous heating of the material while a molten portion is introduced into the enlarged space of the collection chamber, and (d) cooling of the molten plastic material while it is introduced in the collection chamber.

The corresponding device with individual, electrically heated melting bodies and the respective collection bodies, partially traversed by cooling channels, assigned thereto is extremely complicated and prone to failure, very difficult to control from the point of view of temperature setting and not suitable for an economical operation in view of the time-consuming process steps (a) to (d). Consequently the plastic components are not softened in defined temperature zone, but melt on contact with heated bodies.

OBJECT OF THE INVENTION

It is the object of the invention to provide a process and a device for the sorting of thermoplastic components from a mixed stream and for the sorting of different types of thermoplastic materials which overcomes the drawbacks of separation based on adhesion and wherein the separation principle is no longer based on adherence or on the adhesive behavior of the softened thermoplastic material, but on a selective mechanical anchoring on separating bodies with a special configuration.

SUMMARY OF THE INVENTION

In order to achieve this object in a process of the aforementioned kind the invention provide that the plastic components are softened by being heated in the mixed stream in temperature zones specific to type before they are picked up by the separating bodies, after which the softened plastic components are affixed to the separating bodies which penetrate the softened surface of the plastic components or pierce the softened surfaces and then finally removed from the separating bodies.

Advantageously the process of the invention relies on a mechanical fixation of the plastic components, in contrast to the unsatisfactory separation principle based on adherence or adhesive behavior. Separating bodies either penetrate the sufficiently softened surface of the plastic components or pierce this surface, whereby the plastic components are securely affixed and after that removed from the separating bodies by mechanical means. Plastic components of one type of plastics which are sufficiently softened at the applied process temperature so that separating bodies can penetrate their surface, are selected from other types of plastics whose structure has for instance not yet been softened at the applied temperature. The same occurs also with foreign bodies such as made of metal, paper, ceramic or the like, which are not subject to a selective softening through heating.

An embodiment of the invention provides that the penetration of the separating bodies into the surface of the plastic components heated specifically to their type takes place under the influence of the force of gravity.

Depending on the softening degree of the type of plastic to be selected, according to a further feature of the invention, it is possible effect the penetration of the separating bodies into the surfaces of the plastic components softened by the heating specific to type by a pressure force generated in a gap between the support surface and a separating body.

Thereby one embodiment provides that the force required for the penetration of the separating bodies into the surface of the plastic components softened by heating specific to type is determined by the elastic yielding of the support surface or the separating body, as well as by the size and shape of the plastic components. This makes possible an extremely uniform setting and maintaining of the pressure force generated in the gap between support surface an separating body.

Finally one embodiment of the process provides that the surface of the separating bodies be coated with an anti-adhesive layer. This process step is not complicated and results in a certain removal of the plastic particles stuck to the separating bodies, this being the reason why the continuous condition of readiness of the separating bodies during the sorting process is maintained without change.

A device for implementing the process of the invention is characterized by at least one separating body acting as conveyor, having a flat or curved surface provided with structures for penetrating or piercing the plastic components which have been previously softened through selective softening by applying heat specific to their type, as well as for securing the plastic components to the separating body and with means for the removal of plastic components affixed to the separating body after they have been separated from the mixed stream, as well as with means for producing well defined temperature zones for the selective heating of the plastic components in the mixed stream prior to their pickup by the separating bodies.

A particular advantage of this device is its extremely simple construction. Thereby corresponding to the features of the dependent claims embodiments can be provided wherein the structured surface of the separating bodies is formed by grooves or knurls. Thereby the crests of the grooves or knurls can penetrate the softened plastic components and hold them. The grooved or knurled surfaces have the advantage that even comparatively small plastic components, such as the ones occurring during comminution processes, can be separated. Thereby the grooved or knurled surfaces can be roller surfaces.

According to one embodiment the separating bodies can be rollers, bands or plates provided with bristles, needles, pins or lamellae. With the corresponding selection of suitable surface structures of separating bodies the person skilled in the art can optimize the sorting process on target depending on the materials to be separated.

In an embodiment of the invention the separating body forms a gap with a support surface. Thereby the support surface can be a pressure roller or a passing conveyor belt, whereby the conveyor belt is pressed against the separating body at the location where support is needed by one or more pressure rollers. The pressure rollers can be made of metal, plastic material or soft elastic materials such as rubber or foam, or can have an inflatable rubber or plastic jacket in the shape of a cylinder. The selection of the suitable material or combination of materials is made with regard to the mechanical demands made on the separating body.

Advantageously separating bodies can be provided with an anti-adhesive layer, whereby on the one hand only strictly defined plastic components can be affixed due to the surface structure and on the other hand the affixed plastic components can be completely removed when scraped off. Negative effects such as the adhesion of a thermoplastic layer to the surface of the separating bodies are avoided due to the present of the anti-adhesive layer.

According to another feature of the invention several devices with similar or different construction are arranged in cascade one after the other. By arranging several devices according to the invention in succession it is possible for instance due to targeted temperature control to perform a separation of various types in a single run.

BRIEF DESCRIPTION OF THE DRAWING

The above and other objects, features, and advantages will become more readily apparent from the following description, reference being made to the accompanying drawing in which:

FIG. 1 is a perspective view of a separating body of roller form;

FIG. 1A is a diagrammatic perspective view of another such body;

FIG. 1B is an end view of another separating body;

FIG. 1C is a side view of a separating body;

FIGS. 2A–2D are diagrammatic sectional views of separating bodies with different surface structures;

FIG. 3 is a lateral view of a sorting device;

FIG. 4 is a lateral view of another sorting device;

SPECIFIC DESCRIPTION

Figure 5:
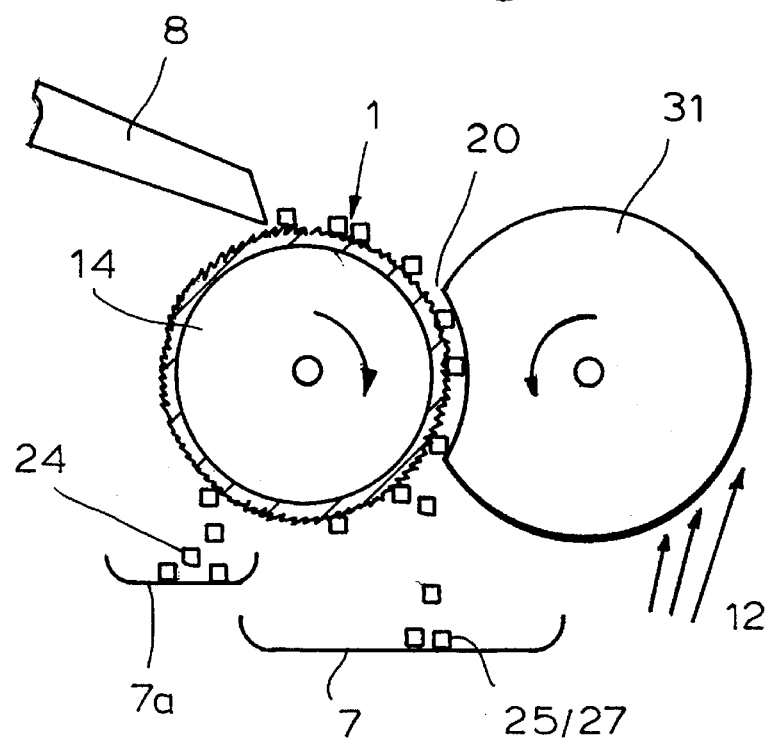
FIG. 5 is a lateral view of a sorting device with elastic pressure roller.

FIGS. 1, 1A, 1B and 1C show three separating bodies $4a$, $4b$ and $4c$, designed as rollers with different surface structures. The roller-shaped separating body $4a$ is a so-called brushing roller with brush-like surface structure $10a$ (FIG. 1A). The bristles forming the brushing surface can be made of wire or very hard plastic wires. The separating body $4b$ has a surface $10b$ provided with pins. These pins $10b$ (FIG. 1) can be made out of heat-conductible materials such as copper, silver or brass for the purpose of good heat conductivity and their length and diameter are optimally adjusted to the sorting task at hand.

Finally FIG. 1C shows a lamellae roller 4c with circularly shaped lamellae.

The surface structure of the separating bodies 4a to 4c designed as rollers are optimally suited to the sorting task of different types for plastic materials. A basis therefor is the softening behavior of thermoplastic materials, whereby these have a characteristic temperature range for each type of plastic, and when this range is reached they convert from the solid state to a softened, rubber-elastic state. If there are several different types of plastic materials or other materials in a mix, then it is possible to selectively soften a chosen type of thermoplastic material through selective heating. In a mixed stream which can also contain hard materials as further components, such softened thermoplastic materials have a fundamentally different elastic behavior than the other components. The use of this difference in the elastic behavior for a selective fixation on the separating bodies 4a to 4c. FIGS. 1, 1A, 1B and 1C or 14, 15, 16 (FIG. 7) provided by the invention by means of structures at the separating bodies according to the invention, represents the crux of the present invention.

In the case of pin or lamellar rollers 4b, 4c it is possible to elastically form or elastically fasten the pins or lamellae 10b or 10c on the roller, so that they can individually adjust to the respective dimensions of the components of the mixed stream. In a brush roller 4a it is possible to achieve the same through the elasticity of the individual bristles 10a.

Advantageously separating bodies with a defined surface structure can be used. Such surfaces are represented purely schematically in FIGS. 2A–2D and have similar comb-like cross sections 11a to 11d. These form surface grooves or knurls with more or less pronounced peaks. The groove edges can penetrate the plastic material according to its degree of softening and fasten the corresponding components. Grooved surfaces 11a to 11d have the advantage that also small plastic parts, such as those resulting from a comminuting process, can be separated.

Separating bodies 4a to 4c, or separating bodies 14, 15, 16 can be composed of different materials and combination of materials, e.g. of surface-coated metal, as long as they meet the thermal and mechanical requirements. It can for instance be advantageous to use separating bodies made of material with good heat conductivity, because this way heat required for the softening of the plastic material can be brought to the contact zone.

FIGS. 3 to 6 show devices for the implementation of the method of the invention with various embodiments. FIG. 3 shows a roller-shaped separating body 4 with any desired surface structure. A conveyor belt 3 guides from the left side a mixed stream 1 with various plastic components and in certain cases foreign materials along a transport gap 20 formed between the separating roller 4 and the conveyor belt 3. This transport gap 20 is created between two support rollers 2 guiding the conveyor belt 3 and the surface structure of the separating roller 4. Selectively heated plastic components 24 remain clinging to the surface structure of separating roller 4, and are scraped off by a doctor blade 5 on the runoff left side and thrown into discharge trough 7. The foreign matter parts not picked up by the separating roller 4 continue to remain on the conveyor belt and are collected at a different location.

The device shown in FIG. 4 presents only unessential differences with respect to the embodiment in FIG. 3. Instead of the comparatively long gap 20 between a support surface 21 formed by the conveyor belt 3 and separating roller 4 in the embodiment according to FIG. 4 there is comparatively short gap between the support roller 2 and the separating roller 4.

FIG. 5 shows another embodiment of the device, whereby as support roller a gas-filled, highly elastic pressure roller 31 is used. The mixed stream is brought in from above through a feeding duct 8 and after a short ride on the surface of separating roller 14 traverses the gap 20 in an approximately vertical surface area between the separating roller 14 and the elastic pressure roller 31. In this arrangement for instance it is possible to heat the separating roller 14 from the inside, in order to transport heat to the plastic components to be separated in the mixed stream. In order to avoid a thermal overload of the elastic pressure roller 31, a cooling air flow 12 is provided, under whose influence the surface temperature of the elastic pressure roller 31 is balanced and kept at an acceptable level. Plastic components of one type affixed to the separating roller 14 are scraped off with the doctor blade 5 and thrown into the trough 7a. The parts of other plastic materials or foreign matter 25/27 which have not been picked up by the separating roller 14 are thrown into the trough 7.

Figure 6:
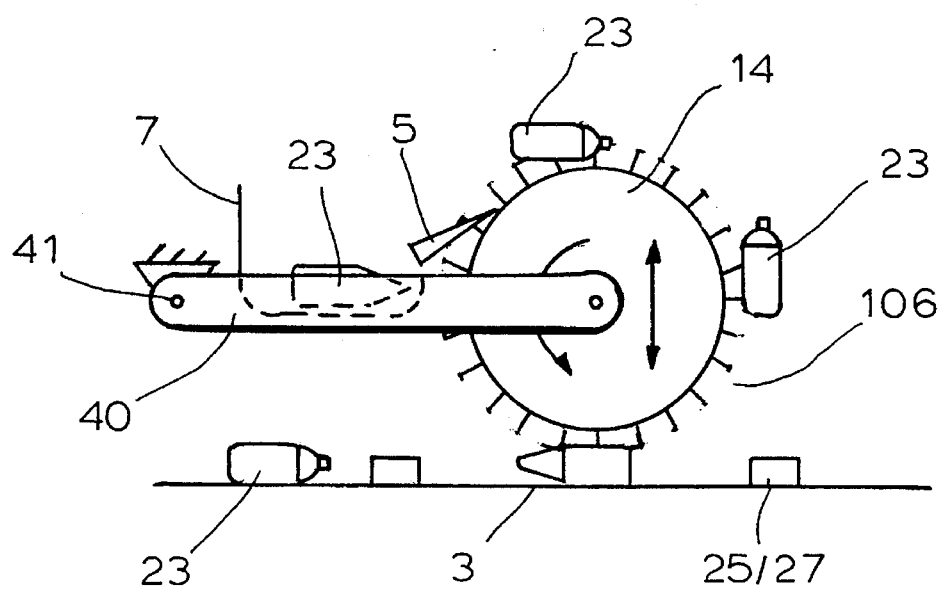
FIG. 6 is a lateral view of a sorting device with separating roller and heated pins.

FIG. 6 shows a further variant of the device, wherein the separating roller 14 has heated pins 10b. The conveyor belt 3 brings along plastic bottles 23 and other types of plastic materials or foreign matter 25/27 underneath the separating roller 14. The latter is linked to an articulation 41 via an approximately horizontal arm 40 and is relieved of weight in a manner known per se, for instance by a restoring element or a counter-weight. As a result of this weight relief, the separating roller 14 rolls with a precisely settable force over the components of the mixed stream, whereby the heated pins 10b penetrate a selectively softenable type of plastic bottles 23 and transport those around with the separating roller 14, until they are scraped off by the doctor blade 5 and thrown into the discharge through 7. The plastic components or foreign matter 25/27 which could not be softened are transported by the conveyor belt to a further collection location. In this arrangement it is for instance possible to achieve a separation in the mixed stream of hollow plastic bodies, such as plastic bottles, from non-plastic products, such as glass or metal containers. Compared to other separating processes based on the specific weight, the present process is not sensitive to residues of the contained goods. The pins 10b of the separating roller 14 can be provided for this special purpose with a barb which assists the secure fixation, for instance of plastic bottles. These barbs also do not impair the scrape-off operation, because even stronger affixed plastic parts can be scraped off with a sufficiently stable doctor blade.

Figure 7:
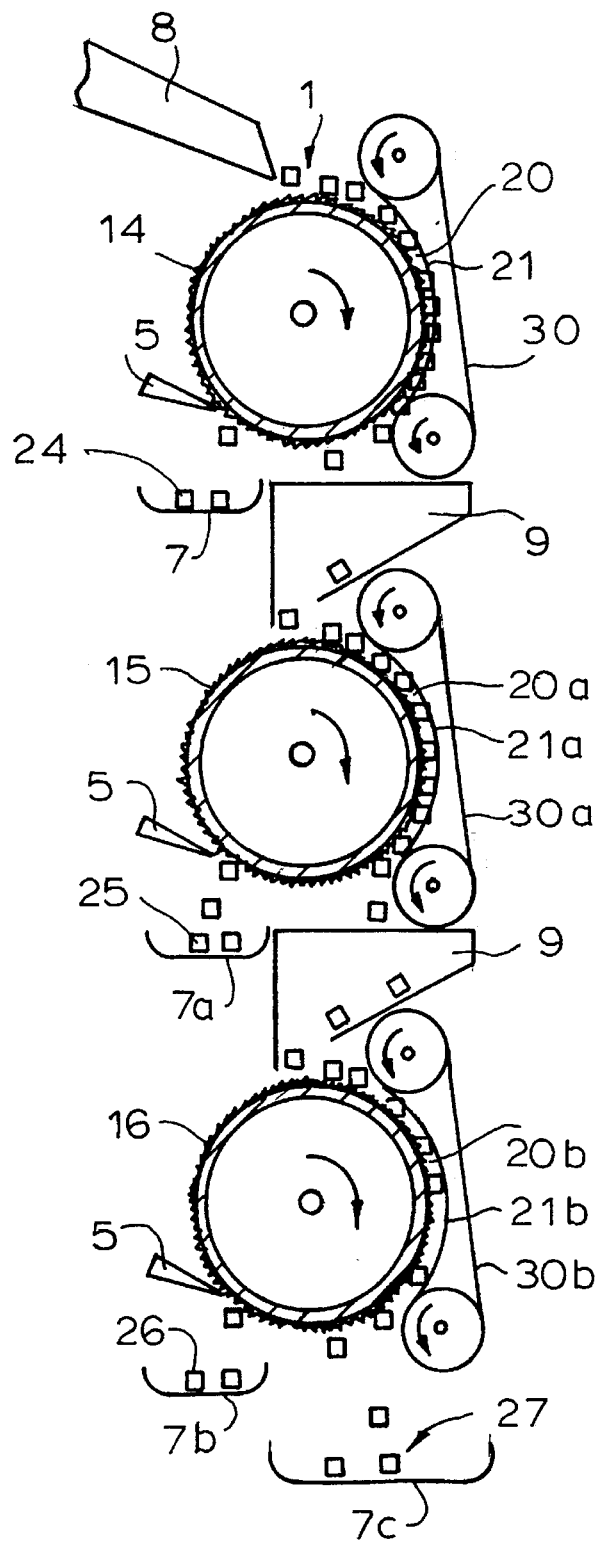
FIG. 7 is a lateral view of three separating device arranged in a cascade one under the other.

In FIG. 7 for instance an arrangement is shown wherein due to the succession in cascade of several devices according to the invention, through targeted temperature control it is possible to achieve without problems the separation of several different types 24, 25, 26 of plastic material, as well as of foreign matter 27. From top to bottom, separating rollers 14, 15, 16 having the identical or different structures can be used. Each individual arrangement corresponds thereby to the embodiment according to FIG. 5, whereby in each case a separation gap 20, 20a, 20b is created between a separating roller 14, 15, 16 and the corresponding elastic pressure roller 31 or a support surface 21, 21a, 21b of a pressure belt 30, 30a, 30b. For the collection of the individual types 24, 25, 26 of plastic material serve the troughs 7, 7a, 7b, and intermediate materials are each guided through chutes 9 from an upper device to a device located therebelow.

The process and the devices according to the invention are not complicated, very suitable and safe to operate, and implement an extraordinarily economical method for sorting plastic materials during recycling. The invention thus proves to be a contribution to the relief of the environment from waste, of great importance to the national economy.

We claim:

1. A process for separating thermoplastic articles from a mixed stream of articles and sorting different types of thermoplastic articles from one another, said process comprising the steps of:

(A) heating said thermoplastic articles in said mixed stream and in different temperature zones depending upon the article type to respective softening temperatures;

(B) pressing surface formations of respective separating bodies into the respective thermoplastic articles at the respective softening temperatures thereof while applying a counterforce to said articles against said separating bodies so that said surface formations at least partially penetrate into the respective articles because of softening thereof but do not penetrate into nonsoftened portions of other articles, thereby selectively impaling penetrated articles on the respective separating bodies;

(C) thereafter removing impaled articles from the separating bodies; and (D) limiting adhesion of softened thermoplastic articles to said separating bodies by coating same with an antiadhesive coating.

2. The process defined in claim 1 wherein penetration of said separating bodies into thermoplastic articles which have been softened is effected by a pressure force exerted in a gap between each separating body and a support surface juxtaposed therewith.

3. An apparatus for separating thermoplastic articles from a mixed stream of articles and sorting different types of thermoplastic articles from one another, said apparatus comprising:

means for forming a mixed stream of articles including different types of thermoplastic articles and displacing said mixed stream along a path;

heating means along said path for heating said thermoplastic articles in said mixed stream and in different temperature zones depending upon the article type to respective softening temperatures;

separating bodies disposed along said path and juxtaposed with respective supports for pressing surface formations of respective separating bodies into the respective thermoplastic articles at the respective softening temperatures thereof by counterforce applied to said articles against said separating bodies so that said surface formations at least partially penetrate into the respective articles because of softening thereof but do not penetrate into nonsoftened portions of other articles, thereby selectively impaling penetrated articles on the respective separating bodies;

means for thereafter removing impaled articles from the separating bodies; and an antiadhesive coating on said separating bodies for preventing adhesion of said thermoplastic articles to said separating bodies.

4. The apparatus defined in claim 3 wherein said surface formations are pins.

5. The apparatus defined in claim 3 wherein said surface formations are bristles.

6. The apparatus defined in claim 3 wherein said surface formations are lamellae.

7. The apparatus defined in claim 3 wherein said surface formations are formed by knurls and grooves.

8. The apparatus defined in claim 3 wherein said separating bodies are rollers.

9. The apparatus defined in claim 3 wherein said support is formed by a belt.

10. The apparatus defined in claim 3 wherein said support is an inflatable member deformed by said mixed stream.

* * * * *